Figure 3:
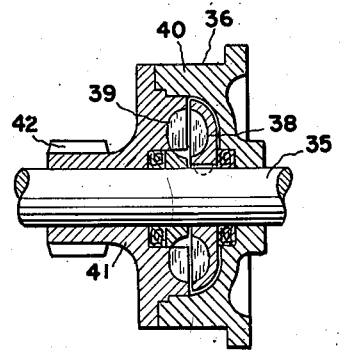

Feb. 5, 1952   J. H. ANDERSON   2,584,246
PERCUSSION TOOL
Filed June 17, 1948   2 SHEETS—SHEET 1
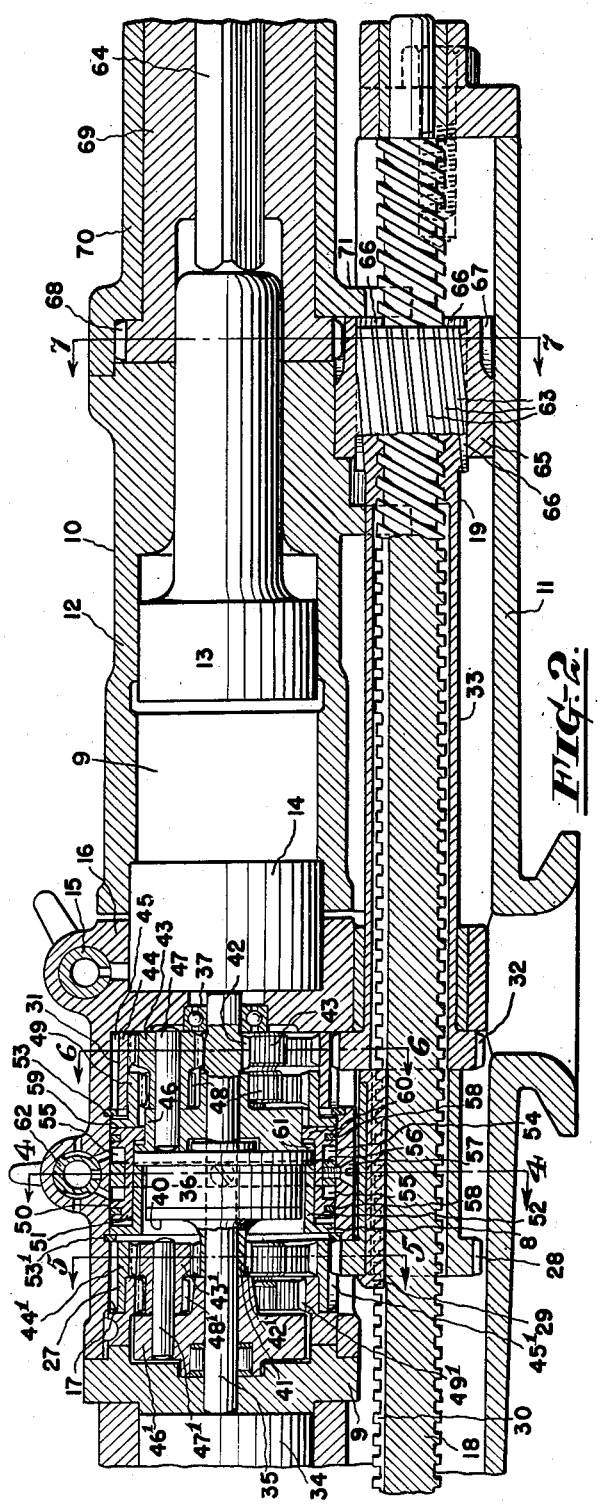
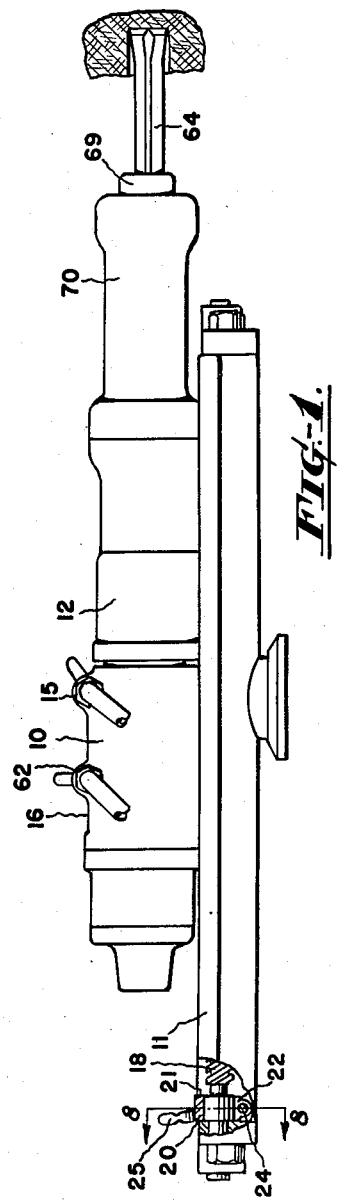
INVENTOR
James H. Anderson
BY
HIS ATTORNEY.

Feb. 5, 1952 J. H. ANDERSON 2,584,246
PERCUSSION TOOL

Filed June 17, 1948 2 SHEETS—SHEET 2

INVENTOR
James H. Anderson
BY
HIS ATTORNEY.

Patented Feb. 5, 1952

2,584,246

UNITED STATES PATENT OFFICE 2,584,246

PERCUSSION TOOL

James H. Anderson, Easton, Pa., assignor to Ingersoll-Rand Company, New York, N. Y., a corporation of New Jersey Application June 17, 1948, Serial No. 33,607

13 Claims. (Cl. 121—5)

This invention relates to percussion tools, and more particularly to a fluid actuated rock drill and means for feeding the working implement of a rock drill into its work.

Heretofore such means were generally of either the type incorporating a chuck geared directly to a driving means, or the familiar rifle bar-ratchet arrangement. Both of these types have recognized disadvantages.

In the first case, a motor of greater horsepower than is normally needed for rotating the working implement was required in order to prevent the working implement from sticking or binding in the hole, and therefore, at best, it was an inefficient and bulky arrangement.

In the second case, because of the structural weakening effect of a large central bore or hole in the piston for the rifle bar, the piston is, for the same output, of greater size and weight than a solid piston or a piston with a relatively small water hole therethrough.

In the present invention the previously mentioned and other disadvantages are eliminated by feeding the working implement of a rock drill through a novel feed screw-feed nut arrangement in which the nut is geared to the chuck. In this arrangement the feed nut and screw are rotated in the same direction at high speeds but with a low speed differential. Thus a high gear ratio may be obtained which permits the use of a relatively high speed-low horsepower driving motor for the feed nut and screw. A further increase in the gear ratio between the driving motor and the feeding means is obtained by rotating the feed nut through a double planetary gear system, driven directly by the motor, and by rotating the feed screw through a second double planetary gear system. The second gear system is, in this instance, powered by the driven member of a coupling in which relative rotation or slippage occurs between the driving and the driven members, such as a fluid or magnetic coupling, for the purpose of permitting dual control of the reverse feeding of the tool or working implement. That is, by providing a brake means at the end of the shell, the feed screw can be held against rotation, due to slippage in the coupling, thereby reversing the relative speed relation between the feed nut and screw which reverses the motion of the working implement; and a second control may be provided at the tool that will change the relative speeds of the gears in the planetary systems and thereby increase the speed of rotation of the feed nut and halt the rotation of the feed screw to reverse the feeding of the working implement.

In addition to the above arrangement, means are provided in cooperation with the feed nut which utilizes the power normally dissipated in the vibration of the tool to supplement the power of the driving motor. Hence a smaller motor may be used to rotate the working implement in that the vibration of the tool will aid the motor in preventing sticking or binding of the working implement. Moreover this means has the added advantage of reducing or dampening the vibrations of the drill.

It is, therefore, one object of my invention to reduce the vibration of a rock drill.

A second object of my invention is to utilize the recoil of a percussion tool to intermittently rotate the working implement.

Another object is to reduce the direct impact on the feed nut and the feed screw by the drill, due to the reaction impact thereof.

Another object is to provide a mechanism whereby the reverse movement of the working implement greatly exceeds the forward movement thereof at the same motor speed.

A further object is to provide a dual control of the reverse feeding of the drill.

A still further object is to prevent severe impacts on the feeding gears of a rock drill when the drill is being retracted and strikes the end of the shell.

Other objects will be in part obvious and in part pointed out hereinafter.

Figure 4:
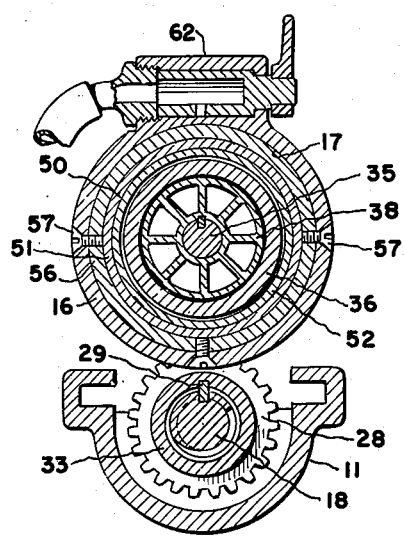
Figure 5:
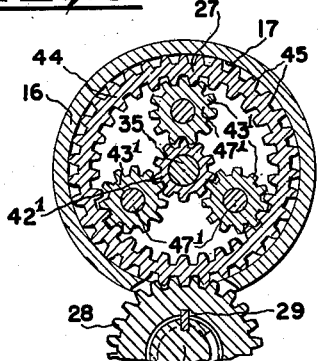
Figure 6:
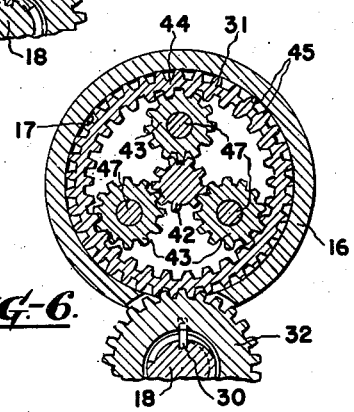
Figure 7:
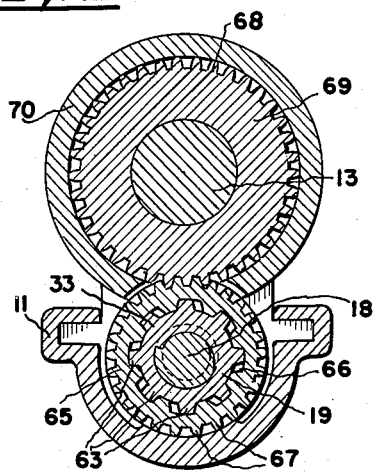
Figure 8:
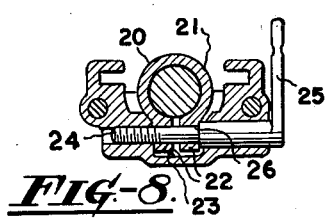

In the drawings accompanying this specification and in which similar reference numerals refer to similar parts, Figure 1 is a side view, partly in section, of a rock drill mounted in a working position, Figure 2 is a longitudinal elevation, in section, of a rock drill embodying the present invention, Figure 3 is a sectional view of a fluid coupling, Figure 4 is a transverse view taken through Figure 2 along the line 4—4, Figure 5 is a transverse view taken through Figure 2 along the line 5—5 and shows a planetary gear train, Figure 6 is a transverse view taken through Figure 2 along the line 6—6 and shows a train similar to that in Figure 5, Figure 7 is a transverse view taken through Figure 2 along the line 7—7, and Figure 8 is a transverse view taken through Figure 1 along the line 8—8 and shows a brake means for the feed screw.

Referring more particularly to the drawings, 10 designates, in general, a rock drill slidably mounted on a support or shell 11, of the usual construction. The drill casing 12 is provided with a bore 9 for a reciprocative hammer piston 13 and houses a valve mechanism 14 for controlling the flow of pressure fluid which operates the piston 13.

The flow of pressure fluid to the valve mechanism 14 is manually controlled by means of a valve 15 mounted on a back head 16 of the rock drill 10. The back head 16 is provided with a chamber 17 which is adapted to receive gear means for rotating a longitudinally disposed feed screw 18 mounted on the shell 11, and a feed nut 19 which encircles and is in threaded engagement with the feed screw 18.

Mounted on the rear end of the shell 11 is a brake 20 which provides a manual control over the rotation of the feed screw 18. The brake shown comprises a split ring 21 which encircles a smooth portion on the feed screw 18 and has radially extended end portions 22 arranged in parallelism and extending into a recess 23 in the shell 11. A bolt 24 passes through said end portions 22 and one end is threaded in the shell so that rotation of the bolt 24, by means of the handle 25 on the other end of the bolt 24, in one direction brings a shoulder 26, on the bolt, to bear on one of the end portions 22 and forces it toward the other portion 22, held from movement by the material which forms the side of the recess 23, and thereby effectively clamps the feed screw 18 against rotation. Rotation of the bolt 24 in the opposite direction releases the brake 20 so that the feed screw 18 is free to rotate.

Rotary motion is imparted to the feed screw 18 by means of a gear train comprising an epicyclic train 27 and a gear 28 which loosely encircles the feed screw 18 and carries a key 29 which slides in a keyway 30 that extends along substantially the entire length of the feed screw 18 in order to permit endwise motion of the feed screw.

Rotary motion is imparted to the feed nut 19 through a second gear train comprising an epicyclic train 31 and a gear 32 formed on the end of an extension 33, on the feed nut 19, which encircles the feed screw 18 and is in spaced relation therewith.

The epicyclic train, designated in general by 31, that rotates the feed nut 19 is, in this instance, of the dual planetary type and is driven directly by a motor 34 positioned rearwardly of the back head 16. The motor 34 bears against an end plate 9 which forms a closure for the chamber 17 and has a central perforation for the motor shaft 35 which extends, succeedingly, through the train 27, a fluid coupling 36 and the train 31, in the chamber 17, and is supported by a bearing 37 at the opposite or forwardly end of the chamber 17.

The coupling 36 is of the usual fan construction and has a driving member or fan 38 keyed to the shaft 35 and a driven member or fan 39, which are hydraulically associated—that is, torque is transmitted from the driving member to the driven member through a fluid medium in the coupling. In this instance, the housing 40, of the coupling 36, forms a part of the driven member and is provided with a rearward extension 41 to which is adapted a driving or central gear 42' of the train 27 which rotates the feed screw 18.

The central or driving gear 42, for the train 31, is formed on the shaft 35, forwardly of the coupling 36, and is adapted to rotate a planetary gear 43 which in turn drives an orbital gear 44 having external teeth 45 that are interlocked with the gear 32 for rotating the feed nut. The external teeth 45 are of somewhat greater width than the teeth on the gear 32 in order to permit endwise motion of the orbital gear 44 resulting from the vibration of the drill.

In the present form of the invention there are three such planetary gears 43 held in a spaced relation around the shaft 35 by means of a stabilizing member 46. The member 46 encircles the shaft 35 and is adapted on receive pins 47 which serve as axles for the planetary gears 43 and for a reduced portion or extension on the planetary gear 43 which forms a smaller planetary gear 48 that is interlocked with an orbital gear 49 of somewhat less diameter than the orbital gear 44. The smaller orbital gear 49 is prevented from rotating by a brake means 50, described in detail hereinafter, thereby causing the gear 48 and the larger planetary gear 43 to travel around the shaft 35 in a direction opposite to the rotation of the orbital gear 44. This means, of course, that the speed of rotation of the orbital gear 44 is slower than when the smaller orbital gear 49 is released, by the brake means, to rotate freely and the axis of the planetary gear 43 is held stationary by said brake means.

In order to obtain this speed control of the orbital gear 44 or effectively of the feed nut gear 32 it drives, rotary motion of the member 46, imparted thereto by the action of the small planetary gears 48 traveling within the smaller orbital gear 49, is controlled by the air operated brake means designated in general by 50. The brake means 50, in one control position, prevents the rotary motion of the orbital gear 49, which requires, of course, that the member 46 rotate whenever the planetary gear 43 is rotated; and in the other control position permits the orbital gear 49 to rotate freely and at the same time holds the stabilizing member 46 against rotation.

The brake means herein shown consists of a brake member 51 which encircles the fluid coupling 36 and rests on an annular support member 52 interposed therebetween. A rim 8 on the support member 52 limits the rearward movement of the brake 51, and the support member 52, in turn, is held against such movement by a ring 53' that extends into the chamber 17 from a groove in the inner surface of the back head 16. The material bounding a groove 54 in the outer periphery of the member 51, cooperates with the inner surface of the back head 16 to define a pressure chamber which is divided into compartments 55 by an annular ring 56 secured to the back head by means of bolts 57. In order to prevent leakage of pressure fluid from the compartments, the ends of the material which forms the sides of the groove 54 are recessed to receive a sealing material 58 which seats against the inner surface of the back head 16. The forward end of the brake 51 bears against a rim 59 on the smaller orbital gear 49 and has an inwardly extended flange 60 which overlies an outwardly extended flange 61 on the stabilizing member 46.

With this arrangement, by valving air into the forward compartment 55 and exhausting it from the rearward compartment 55, by means of a two-way control valve 62 in the back head 16, the pressure fluid acting on the material forming one side of the groove 54, forces the brake member 51 forwardly against the smaller orbital gear 49 and moves it into frictional engagement with a ring 53, similar to the aforementioned ring 53', thereby effectively holding the orbital gear 49 from rotating. In this brake position the orbital gear 44, and therefore the feed nut 19, is rotated at its lower speed.

In the other position of the valve 62, pressure fluid is conducted to the rearward compartment 55 and exhausted from the forward compartment 56 thereby forcing the brake member 51 in a rearwardly direction which releases the orbital gear 49 and brings the flanges 60 and 61 into frictional engagement and clamps the stabilizing member 46 against the housing 40 of the fluid coupling 36 thereby effectively halting rotation of the member 46 and the driven member 39 of the coupling 36. In this brake position the feed nut 19 rotates at its higher speed and also, it is to be noted, the train 27 or effectively the rotation of the feed screw 18, is halted.

The train 27 is similar in construction to the train 31 and it is also similar in operation to that of the train 31 when the brake member 51 is in its forwardly control position. Accordingly, the discussion of the construction and operation of the train 27 will be minimized and the designation of the similar parts of the two trains will be identical with the exception that the numerals referring to the members comprising the train 27 will be primed. The material difference between the two trains 27 and 31 is that the smaller orbital gear 49' is secured to the back head 16 and is at all times prevented from rotary movement and the relative sizes of the gears in the train 27 differ somewhat from those in the train 31 so that the larger orbital gear 44' which is engaged with the gear 28, that rotates the feed screw, turns at a higher speed than does the orbital gear 44 that is engaged with the gear 32, that rotates the feed nut. Because of this relative difference in speeds of the feed nut and the feed screw, the feed nut will have a tendency to advance along the feed screw.

In order to utilize this advancing and rotary motion of the feed nut, the outer surface of the feed nut 19 is provided with splines 63 which are adapted to engage a means whereby such motion may be utilized to feed the rock drill into its work. This means also utilizes the vibratory motion of the rock drill, due to the reversals of the piston 13, to intermittently rotate a working implement 64. Such means comprises a cylindrical member 65 having flutes 66 in the inner surface thereof to cooperate loosely with the splines 63, and gear teeth 67 formed on the outer surface to engage with a gear 68 formed on a chuck 69 in the front head 70 of the drill 10. A radial arm 71 on the drill 10 partially encloses the cylindrical member 65 and maintains a sliding engagement with the opposite end surfaces thereof, thereby preventing endwise motion and permitting rotary motion of the member 65 with respect to the drill.

In operation, assuming that air has been valved into the forward compartment 55, the brake 50 will prevent rotation of the smaller orbital gear 49 and permit rotation of the stabilizing member 46 and the fluid coupling 36. The feed screw 18 will, then, rotate at a relatively higher speed than the feed nut 19 thereby advancing the feed nut 19 along the feed screw 18 to move the working implement 64 into its work. At the same time, the rotation of the feed nut 19 will rotate the cylindrical member 65 which, in turn, rotates the chuck 69 or effectively the working implement. However, the rotation of the chuck 69, due to the rotation of the feed nut 19, is intermittently accelerated and halted by the action of the cylindrical member 65 in response to the vibration of the drill 10. That is, assuming that the piston starts on its forward stroke, the reaction of the drill 10 is in the opposite direction which drives the cylindrical member 65 rearwardly against the splines 63 thereby increasing the rotary speed of the cylindrical member 65. The rotary speed of the cylindrical member 65 relative to the chuck 69 is, during its backward motion, the sum of the speeds imparted thereto by the rotation of the feed nut 19 and the rotation imparted to the member 65 as it is driven along the splines.

When the hammer piston 13 strikes its blow and starts on its rearward stroke the reaction movement of the drill 10 and the member 65 is forwardly and thus the flutes 66 move away from the splines 63 on the feed nut 19 thereby momentarily halting the rotation of the chuck 69 until the rotation of the feed nut 19 moves the splines 63 once again into engagement with the surfaces which form the sides of the flutes 66. The time interval during which rotation of the chuck is interrupted is, of course, dependent on the fit which exists between the splines 63 and the flutes 66.

In the event it is desirable to retract the working implement from its work, it is merely necessary to change the setting of the valve 62 thereby communicating pressure fluid with the rearward compartment 55 which moves the brake member 51 rearwardly to halt the rotation of the stabilizing member 46 and the driven member 39 of the fluid coupling 36 and also to free the smaller orbital gear 49 to permit rotation. This action increases the speed of the larger orbital gear 44, in that the planetary gears 43 are now held from rotation around the shaft 35, and at the same time halts the rotation of the gear train 27 that drives the feed screw 18. Under these conditions, the relative rotation between the feed nut 19 and the feed screw 18 is reversed and greatly increased thereby reversing the direction of movement of the feed nut 19 along the feed screw 18 and at the same time greatly increasing the speed of this longitudinal motion of the feed nut 19 in comparison to the normal forward speed thereof.

It is to be noted in this connection, that the reversal of and increased speed of the longitudinal movement of the feed nut, and hence the drill, along the feed screw occurs without change in the speed of the motor. For example, assume that both the feed nut and feed screw are driven in the counterclockwise direction (as viewed looking forward along the drill from the backhead), the nut being driven at 230 revolutions per minute (R. P. M.) and the screw at 250 R. P. M. The relative speed of the screw to the nut is 20 R. P. M. and the nut will move slowly forward (at about 20 inches per minute) along the feed screw.

When, however, the brake 50 is positioned to halt the rotation of the feed screw, the relative speed between the screw and nut is reversed—i. e., the nut is now moving 230 R. P. M. faster than the screw. Accordingly the direction of longitudinal movement of the nut relative to the screw is reversed so that the nut now moves in the rearwardly direction along the screw at a speed some 10 times as fast as its forward direction. However, due to the shifting of the brake 50, the planetary gears 43 are prevented from moving in a circular path about the shaft 35 and accordingly the speed of the orbital gear 44 is increased so that the feed nut is now driven at a higher speed, say 1800 R. P. M., thereby increasing the reverse longitudinal movement of the drill, relative to the screw, over that attained by merely halting the rotating of the feed screw. The change in relative speed between the feed nut and the feed screw due to the halting of the rotation of the feed screw is, of course, in no way dependent on the speed of the motor, and the increased rotational speed of the feed nut is due entirely to the change in gear ratio in the gear train 31 in the manner previously described.

Such reversing motion may also be accomplished through the brake means provided on the back of the shell 11, by merely applying the brake 20 which will halt the motion of the feed screw 18 and thereby reverse the relative rotation between the feed screw 18 and the feed nut 19 which, of course, reverses the direction of longitudinal motion of the feed nut 19. The speed of reverse movement attainable in the latter method of reversing the direction of motion of the rock drill is not as fast as that obtained by the first method, however it can be accomplished when the setting of the valve 62 is such that the forward compartment 55 is exposed to fluid pressure.

To be noted here, also, is that the heavy spring or other buffer normally found on the back end of the shell to halt the reverse motion of the rock drill has been eliminated by virtue of the fluid coupling arrangement. That is, due to the hydraulic association between the driving and driven members 38 and 39 of the coupling 36, slippage will occur therebetween when the rock drill reaches the end of its travel on the shell 11. Such slippage prevents excessive strain on the various members of the drill that cooperate to impart reverse motion to the drill.

It is now obvious that the present invention presents several distinct advantages over other rock drills and it is a distinct contribution to the field to which it appertains.

While I have shown and described one form of my invention it is to be understood that various changes and modifications may be made therein without departing from the spirit of the invention as set forth in the appended claims.

I claim:

1. A fluid actuated tool comprising a casing having a bore, a front head thereon, a reciprocative piston in the bore, a working implement in the front head to receive blows from said piston, a spirally splined member mounted independently of the casing, a fluted member engaged to the splined member and engaged against longitudinal movement with respect to said casing, and a gear on the last said member engaged to rotate said implement, the fluted member being actuated by the vibration of the tool resulting from reversals of the piston for imparting intermittent rotary movement to the working implement.

2. Means for rotating the working implement of a percussion tool, comprising a splined member, a fluted member interlockingly engaged with the splined member and engaged to said tool against longitudinal movement between the tool and the splined member, gear teeth on said fluted member, and a chuck for the working implement having gear teeth engaged with the first said teeth.

3. A rock drill comprising a casing having a bore, a front and back head on the casing, a reciprocatory piston in the bore, a working implement to receive blows from the piston, a chuck in the front head for holding said implement, a motor in the back head, a fluid coupling driven by the motor, a feed nut engaged to said casing to impart longitudinal movement thereto, a gear train driven by the motor and engaged to the feed nut for rotating the feed nut, a feed screw mounted independently of the casing and threaded in the feed nut, a gear train driven by the coupling for rotating the feed screw at a faster rate than the feed nut, and a gear engaged to said chuck and in threaded engagement with said feed nut and rotated thereby for rotating said chuck, said gear acting responsively to the vibrations of the rock drill for accelerating and interrupting said rotation of the chuck.

4. A rock drill comprising a casing having a bore, a front and back head on the casing, a reciprocatory piston in the bore, a working implement to receive blows from the piston, a chuck in the front head for holding said implement and having a gear thereon, a motor in the back head, a fluid coupling driven by the motor, a feed nut having splines on the outer periphery thereof, a gear train driven by the motor and engaging said nut for rotation thereof, a feed screw mounted independently of the casing and threaded in the feed nut, a gear train driven by the coupling and engaged to the feed screw for rotating the feed screw at a faster rate than the feed nut, and a member having flutes slidably interlocked with the splines on said feed nut and having a gear interlocked with the gear on said chuck.

5. A fluid actuated tool comprising a casing having a bore, a front and back head thereon, a reciprocatory piston in the bore, a working implement in the front head to receive blows from the piston, a longitudinally disposed feed screw mounted independently of the casing, a feed nut on the screw and engaged to said implement and engaged to the casing against longitudinal movement between the casing and the feed nut, a motor in the back head, a coupling driven by the motor, a gear train driven by the coupling and engaged to the screw for rotation thereof, a gear train driven by the motor for rotating the feed nut, and a brake arranged to engage a gear in the second said train for varying the relative rotational speed of some of the gears in the second said train for retracting the working element from a work piece at a rate which exceeds the advancing speed of said implement at the same motor speed.

6. In a percussion tool, a casing having a bore, a front head, a piston in the bore, a working implement in the front head to receive blows from the piston, a feed screw mounted independently of the casing, a feed nut threaded on the feed screw and engaged to said casing for imparting longitudinal movement to said casing, a motor geared to said nut and screw for imparting rotary movement thereto, and a member engaged to the casing against longitudinal movement relative thereto and threaded on said nut and engaged to said working implement to transmit the rotary movement of the screw to the working implement and actuated by the vibration of the tool for rotating said implement.

7. A fluid actuated drill comprising a shell, a casing slidable on the shell and having a bore for a reciprocatory piston, a working implement at one end of the casing, a chuck for rotating said implement, a motor at the other end of said casing, a longitudinally disposed feed screw mounted on the shell, a fluid coupling driven by the motor, a gear train driven by the coupling and engaging said screw for rotation thereof, a feed nut on the screw, a gear train driven by the motor and engaged to said nut, a member in slidable interlocking engagement with said nut and the chuck and engaged against longitudinal movement with respect to said casing for rotating the chuck, and a brake on an end of the screw for preventing rotation thereof to reverse the longitudinal movement of the casing.

8. In a fluid actuated tool, a casing having a bore, a front head on the casing, a reciprocating piston in the bore, a working implement in the front head to receive blows from the piston, a longitudinally disposed feed screw mounted independently of the casing and against longitudinal movement, a feed nut threaded on the feed screw, a motor engaged to said screw and nut for imparting rotary movement to the nut and the screw for moving the nut longitudinally relative to the screw, a member slidably engaged to and rotatable with said nut and locked against longitudinal movement with respect to said casing for imparting longitudinal movement to the casing relative to the screw, said member being rotated relative to said nut in response to vibrations of the casing due to reversals of the piston, and a gear on said member engaged to rotate the working implement.

9. A percussion tool comprising a casing having a bore, a front head on the casing, a piston in the bore, a working implement in the front head to receive blows from the piston, a motor mounted on the casing, a fluid coupling driven by the motor and having a driven member, a feed nut engaged to said casing and said motor, a feed screw mounted independently on the casing against longitudinal movement relative thereto and threaded in said nut and engaged to said driven member, a brake on the casing adapted to engage said driven member to prevent movement thereof, and a brake on the feed screw to halt the rotation thereof.

10. A fluid actuated tool comprising a casing having a bore, a front and back head thereon, a reciprocating piston in the bore, a working implement to receive blows from the piston, a chuck in the front head for holding said implement, a motor in the back head, a hydraulic coupling driven by the motor and having a driven member, a longitudinally disposed feed screw mounted independently of the casing, and against longitudinal movement relative to the casing, a feed nut threaded on the feed screw, a member threaded on said nut and engaged to said casing against longitudinal movement therebetween and engaged to said chuck to impart rotary movement thereto, a gear train driven by the motor and engaged to the feed nut for rotating said nut, a gear train driven by the driven member and engaged to the feed screw to impart rotary movement thereto for advancing the working element into a work piece.

11. A fluid actuated percussion drill comprising a shell, a casing slidable on the shell, a longitudinally disposed feed screw mounted on the shell, a feed nut threaded on the screw and engaged to said casing to prevent longitudinal movement between the nut and the casing, a gear train engaged to said nut for rotation thereof, a motor mounted on the casing and engaged to drive said train, a gear train engaged to said screw for rotation thereof, a fluid coupling driven by said motor and engaged to drive the last said train, a brake arranged to engage the coupling and a gear in the first said train to halt the rotation of the feed screw and increase the rotational speed of the feed nut for reversing the longitudinal movement of the feed nut on the feed screw, and a brake on the feed screw to halt the rotation thereof.

12. A fluid actuated drill comprising a shell, a casing slidable on the shell and having a bore with a reciprocating piston therein, a working implement at one end of the casing, a chuck for rotating said implement, a motor at the other end of said casing, a longitudinally disposed feed screw mounted on the shell, a fluid coupling driven by the motor, a gear train driven by the coupling and engaging said screw for rotation thereof, a feed nut on the screw, a gear train driven by the motor and engaged to said nut, and a member in slidable interlocking engagement with said nut and the chuck and engaged against longitudinal movement with respect to said casing for imparting rotational movement to the chuck in response to vibrations of the casing.

13. A fluid actuated tool comprising, a shell, a casing slidable on the shell and having a bore with a reciprocating piston therein, a working implement at one end of said casing, a longitudinally disposed feed screw mounted on the shell, a motor engaged to said screw for rotation thereof, a feed nut threaded on said screw, a coupling driven by the motor and engaged to said nut for rotation thereof, and a member threaded on said nut and engaged to said working implement for rotation thereof and engaged to said casing to prevent longitudinal movement between the casing and said member.

JAMES H. ANDERSON.

REFERENCES CITED

The following references are of record in the file of this patent:

UNITED STATES PATENTS

| Number | Name | Date |
| --- | --- | --- |
| 308,524 | Sergeant | Nov. 25, 1884 |
| 815,299 | Leyner | Mar. 13, 1906 |
| 1,832,471 | Nell | Nov. 17, 1931 |
| 2,124,627 | Morrison | July 26, 1938 |
| 2,236,700 | Slater | Apr. 1, 1941 |
| 2,249,639 | Sheets | July 15, 1941 |
| 2,265,444 | Morrison | Dec. 9, 1941 |